United States Patent Office 3,542,736
Patented Nov. 24, 1970

3,542,736
POLYURETHANE FIBERS DERIVED FROM 1,4-DIETHYLBENZENE-β,β'-DIISOCYANATE
Karl W. Rausch, Jr., Hamden, and Adnan A. R. Sayigh, North Haven, Conn., assignors to The Upjohn Company, Kalamazoo, Mich., a corporation of Delaware
No Drawing. Continuation-in-part of application Ser. No. 447,865, Apr. 13, 1965. This application May 14, 1968, Ser. No. 728,924
Int. Cl. C08g 22/26
U.S. Cl. 260—75     4 Claims

ABSTRACT OF THE DISCLOSURE

Polyurethane (spandex) fibers derived from 1,4-diethylbenzene-β,β'-diisocyanate (DEBI) are described. The fibers are prepared by conventional procedures but using DEBI in place of the diisocyanates hitherto used. The resulting fibers are superior to those hitherto prepared in their resistance to chlorine bleach and in their high modulus, permitting the use of finer gage fibers.

CROSS-REFERENCE TO RELATED APPLICATION

This application is a continuation-in-part of application Ser. No. 447,865 filed Apr. 13, 1965, now abandoned.

BACKGROUND OF THE INVENTION

Field of the invention

This invention relates to improved polyurethane compositions and is more particularly concerned with improved compositions and processes for making polyurethane-containing elastic fibers and filaments.

Description of the prior art

Polyurethane based fibers and filaments are well-known in the art. Such fibers and filaments and methods for their preparation are described, for example, by Saunders et al. Polyurethanes, Chemistry and Technology, Part II, pages 661–733; Interscience, New York, 1964. The so-called spandex fibers are a particular type of polyurethane fiber which has found wide acceptance in the elastomeric fiber market particularly for foundation garments and swim wear. The term "spandex fiber" is used herein in its generic sense as defined by the Textile Fiber Products Identification Act to mean a manufactured fiber in which the fiber forming substance is a long-chain synthetic elastomer consisting of at least 85 percent of a segmented polyurethane.

One of the problems hitherto encountered in the preparation of polyurethane fibers, particularly of the spandex type, is that of discoloration which occurs on ageing. In order to overcome this difficulty it has been necessary to resort to the relatively expensive procedure of coating the polyurethane fiber with a material which is not subject to ageing or color change in the presence of light.

We have now found that the difficulties hitherto encountered with polyurethane fibers can be overcome by employing as the sole diisocyanate or as the major diisocyanate in the formation of the polyurethane fiber the material 1,4-diethylbenzeneβ,β'-diisocyanate. We have also found that not only is the resistance to ageing and coloration of the resultant fiber improved by the use of this particular diisocyanate but that other properties in particular the strength and modulus of the resulting fiber, are significantly improved.

SUMMARY OF THE INVENTION

Accordingly, this invention in its broadest aspect comprises a process for the preparation of polyurethane fibers in which process 1,4-diethylbenzeneβ,β'-diisocyanate is employed as the sole or major component of the diisocyanate reactant. The invention also comprises the fibers so produced.

DETAILED DESCRIPTION OF THE INVENTION

In carrying out the process of the invention the methods used are those hitherto employed in the art for the preparation of spandex fibers, the novel feature of the process being the use of the above diisocyanate as the sole or the major component of the diisocyanate employed.

In one embodiment of the invention the spandex fiber is made by reacting an hydroxy terminated polyol, as hereinafter defined, with less than an equivalent proportion of the above diisocyanate to form an hydroxy terminated prepolymer. The latter prepolymer is then reacted with more than an equivalent amount of the above diisocyanate to form an isocyanate-terminated prepolymer. The latter prepolymer is then extended by reaction with a difunctional active hydrogen containing compound of which the aliphatic glycols, aliphatic aminoalcohols, and primary diamines are representative examples. The term "active hydrogen containing compound" as used herein means a compound which shows a positive reaction in the Zerewitinoff reaction as described in J. Am. Chem. Soc., 49, 3181, 1927. The reaction of the prepolymer with the extender can be carried out in solution in a suitable solvent such as dimethylformamide to prepare a highly viscous solution of the ultimate polyurethane which can then be subjected to wet spinning to form the desired fiber.

Alternatively the second prepolymer obtained as described above can be extruded in the form of a filament through a bath containing a solution of the appropriate extender. When this latter method is employed, the extender is usually a diamine such as ethylene diamine.

In a modification of the above procedure, the formation of the hydroxy-terminated prepolymer is omitted and the first step is the direct formation of an isocyanate-terminated prepolymer. In a further modification of this last method, the isocyanate-terminated prepolymer can be cured in two stages. In the first stage the prepolymer is extruded through a bath containing the extender, preferably a diamine. The filament so formed has an inner core of uncured prepolymer and the final curing stage is the exposure of the filament to water which penetrates the surface skin and cures the inner layer.

In each of the above methods the isocyanate employed is 1,4-diethylbenzene β,β'-diisocyanate above or is a mixture of the latter compound with a second diisocyanate, preferably an aliphatic diisocyanate such as hexamethylene diisocyanate, pentamethylene diisocyanate, tetramethylene diisocyanate and the like. Where the latter mixtures are employed, the proportion of the 1,4-diethylbenzene-β,β'-diisocyanate is preferably within the range of 60 to 100 percent by weight of the mixture. In the preferred embodiment of the invention the isocyanate employed is exclusively 1,4-diethylbenzene β,β'-diisocyanate.

In carrying out the process of the invention, the prepolymer, whether this be hydroxy-terminated or isocyanate-terminated, is formed by bringing together the isocyanate and the polyol in the required proportion under substantially anhydrous conditions in accordance with procedures well-known in the art. The reaction mixture is preferably heated at a temperature within the range of about 90° C. to about 150° C. Where it is desired to prepare an hydroxy-terminated prepolymer as in the first process described above, the disocyanate is employed in a proportion from about 0.5 to about 0.8 equivalent per equivalent of polyol. When it is desired to prepare an isocyanate-terminated prepolymer, either as the first step in the reaction, or by reaction of an hydroxy-terminated prepolymer with diisocyanate, the diisocyanate is preferably employed in a proportion of about 0.7 to about 1.5 equivalents per equivalent of polyol whether the latter be free polyol or polyol already present in an hydroxy-terminated prepolymer.

The reaction of the isocyanate-terminated prepolymer with the chain extender is preferably carried out at a temperature within the range of from about 70° C. to about 1100° C. As set forth above, the reaction of the prepolymer and the chain extender can be carried out in the presence of a solvent. Suitable solvents are tetrahydrofuran, dimethyl formamide, dimethyl acetamide, cyclohexane, dioxane, dimethyl sulfoxide, and the like. The preferred solvent is dimethylformamide. When the reaction of the prepolymer and the chain extender is carried out under these conditions, the proportion of the difunctional active hydrogen containing extender employed is within the range of about 0.8 to about 1.0 equivalent per equivalent of free isocyanate in the prepolymer.

When the fiber is prepared by extrusion of the isocyanate-terminated prepolymer through a bath containing the extender, the extender is always present in solution in excess and the proportion of extender to prepolymer is not critical.

In an alternative procedure for the preparation of fibers according to the invention an isocyanate-terminated prepolymer, prepared as described above by reaction of 1,4-diethylbenzene-$\beta,\beta'$-diisocyanate with a polyol or with an hydroxy terminated prepolymer obtained as described above, is extended by reaction with a difunctional active hydrogen containing compound as defined above, preferably an aliphatic diol such as 1,4-butanediol. The resulting polymer is then melted extruded, using processes and apparatus conventional in the art for this purpose, to obtain the desired fiber.

The polyols which are employed in the process of the invention are those normally employed in the preparation of elastic filaments. Such polyols are generally those having hydroxyl numbers from about 450 to about 35 preferably from about 110 to about 55 and an acid number which is low and preferably less than one. The polyols can be branched-chain or linear but are preferably essentially linear.

Examples of essentially linear polyols meeting the above specifications include poly(alkylene ether) diols, polyester diols, lactone polyester diols, and poly(esteramide)diols, and mixtures thereof. The poly(alkylene ether)diols are prepared by polymerizing one or more cyclic ethers such as ethylene oxide, propylene oxide, dioxolane, tetrahydrofuran, and the like. The polyester diols are derived by condensing a dicarboxylic acid such as adipic acid with an excess of a dihydric alcohol such as ethylene glycol, propylene glycol, butylene glycol or mixtures of two or more of said alcohols. The poly(esteramide)diols are prepared by condensing a dicarboxylic acid such as adipic acid with a hydroxyamine or a mixture of a diamine and an dihydric alcohol, the dihydric alcohol being present in excess so that the resulting polyesteramide is hydroxy terminated. The lactone polyester diols are prepared by polymerizing a lactone, preferably caprolactone, using the appropriate diol or hydroxyamine such as ethanolamine as an initiator.

The above types of diols and the methods for their preparation are well described in the art; see, for example, Saunders, Polyurethanes, Chemistry and Technology, Part I, Interscience, New York, 1963; Bayer et al., Rubber Chemical and Technology, 23, 812 (1950); U.S. Pat. 2,933,477.

Representative of the above types of diol are:

poly(oxypropylene)glycol
poly(oxyethylene)glycol
poly(oxyethyleneoxypropylene)glycol
poly(oxytetramethylene)glycol
poly(oxytrimethylene)glycol
poly(caprolactone)diol
poly(ethylene adipate) diol
poly(1,2-propylene adipate) diol
poly(propylene/ethylene adipate)diol
(poly(1,4-butylene adipate)diol
poly(1,4-butylene-/ethylene adipate)diol The difunctional active hydrogen containing extenders which are employed in the processes of the invention include: water, hydrazine, organic diamines, glycols, amino alcohols and the like. Examples of organic diamines are aliphatic primary diamines, such as ethylene diamine, trimethylene diamine, tetramethylene diamine, 1,3-butane diamine and the like: aromatic diamines such as paraphenylene diamine, metaphenylene diamine, benzidine, 4,4'-methylenedianiline, and the like: and mixed aliphatic aromatic diamines such as m-xylylene diamine, 1,4-diethylbenzene-$\beta,\beta'$-diamine, 1,4-dipropylbenzene-$\gamma,\gamma'$-diamine, and the like. The preferred diamines are the aliphatic diamines particularly ethylene diamine and trimethylene diamine. Examples of glycols which can be employed as chain extenders are aliphatic glycols such as ethylene glycol, trimethylene glycol, 1,4-butanediol, 1,6-hexanediol, 1,8-octanediol and the like. Examples of amino alcohols which can be employed as chain extenders are ethanolamine, propanolamine, butanolamine, and the like.

In another type of elastomeric fiber within the scope of the invention, a polyurethane is prepared by reacting a mixture of a polyol as defined above, 1,4-diethylbenzene-$\beta,\beta'$-diisocyanate and an aliphatic glycol having an unsaturated side chain such glycerol-1-monoallyl ether and 2(allyloxymethyl)-2-methyl-1,3-propanediol. The reaction is preferably carried out at elevated temperatures advantageously of the order of about 50° C. to about 150° C. The overall ratio of hydroxy to isocyanate groups in the reaction mixture is preferably of the order of about 0.95 and the proportion of the polyol to aliphatic glycol is generally of the order of 1 to 2 moles of the former to about 1 mole of the latter. The resulting polyurethane contains a chain having unsaturated side chain groups derived from the allyl ether groups of the glycol. This polymer can then be vulcanized using procedures known in the art, for example, by mixing with sulfur, a vulcanization accelerator and, if desired, with fillers such as carbon black or talc. The resulting mixture is then plasticized in the conventional manner. The resulting viscous mass is then extruded to form the desired filaments which are cured by heating.

The polyurethane fibers prepared in accordance with the invention exhibit the desirable physical properties, especially tensile strength and elongation, which are found in commercially acceptable polyurethane fibers prepared from conventional isocyanates such as toluene diisocyanate [see, for example, Saunders et al., Polyurethanes, Part II, Interscience, New York, 1964, pages 706 and 707 for a listing of the properties of commercial spandex fibers]. More importantly the polyurethane fibers prepared from DEBI in accordance with the invention possess marked advantages over corresponding fibers made by commercially used processes from conventional polyisocyanates. Thus, the fibers prepared in accordance with the invention possess markedly and unexpectedly increased modulus as compared with conventional polyurethane fibers of comparable denier. As will be readily appreciated by one skilled in the art, this finding means that one can produce fibers of finer denier and achieve the same performance, as far as elastic properties are concerned, as with a coarser denier thread of the prior art. This finding is of particular importance in the construction of garments, and support hose, and the like, where the use of finer thread has marked aesthetic appeal.

A second unexpected advantage in the fibers obtained in accordance with the invention lies in their resistance to discoloration on exposure to oxidizing chlorine bleaches commonly used in household and commercial laundering processes. The tendency of the polyurethane fibers hitherto available to turn yellow on exposure to such bleaches has proved to be a considerable disadvantage to their use in the garment industry. It has now been found, surprisingly and unexpectedly, that the fibers prepared from DEBI in accordance with the present invention are free from this disadvantage and retain their white color even on prolonged exposure to oxidizing bleaches.

The following examples describe the manner and process of making and using the invention and set forth the best mode contemplated by the inventors of carrying out their invention but are not to be construed as limiting.

*Example 1.*—This example illustrates the preparation of an elastomeric polyurethane by forming a hydroxyl-terminated prepolymer then adding diisocyanate and extending with a diol.

To 208 grams of a 520 equivalent weight poly(ethylene-propylene adipate) which had been dried under vacuum at 110° C. for one hour was added 28.5 grams of 1,4-diethylbenzene-$\beta,\beta'$-diisocyanate. The mixture was reacted under vacuum for two hours at 120–130° C. After cooling to 100° C. an additional 58.0 grams of 1,4-diethylbenzene-$\beta,\beta'$-diisocyanate was added, and the reaction was continued for two hours at 120 to 130° C. The prepolymer was again cooled to 70° C. at which temperature 17.6 grams of 1,4-butanediol was added. The mixture of prepolymer and extender were mixed under vacuum until the material was homogeneous. It was then poured into a covered tray and held for four hours at 100° C. The resulting polymer was granulated and melt extruded into a thread which was post-cured at 80° C. for 16 hours.

*Example 2.*—This example illustrates the preparation of a composition of the invention by forming an isocyanate-terminated prepolymer then extending with a difunctional active hydrogen chain extender.

To 208 grams of a 520 equivalent weight poly(ethylene-propylene adipate) which had been dried under vacuum at 110° C. for one hour was added 86.5 grams of 1,4-diethylbenzene-$\beta,\beta'$-diisocyanate. The mixture was reacted under vacuum for three hours at 120 to 130° C. The resulting prepolymer was cooled to 70° C. at which temperature 17.6 grams of 1,4-butanediol was added. The prepolymer and extender were mixed under vacuum until the material was homogeneous. The mixture was then poured into a covered pan and held for four hours at 100° C. The resulting polymer was granulated and melt extruded into a thread which was post-cured at 80° C. for 16 hours.

*Example 3.*—This example illustrates the preparation of a thread by extrusion into a setting bath containing aqueous ethylenediamine solution.

To 1.0 equivalent of poly(oxytetramethylene)glycol was added 0.7 equivalent (75.6 grams) of 1,4-diethylbenzene-$\beta,\beta'$-diisocyanate. The mixture was heated to 120 to 130° C., and held for two hours to form an hydroxyl-terminated prepolymer. This prepolymer was then isocyanate-terminated by a two hour reaction at 120 to 130° C. with 1.0 equivalents (108 grams) of additional 1,4-diethylbenzene-$\beta,\beta'$-diisocyanate. This liquid prepolymer was extruded into a 10% aqueous by weight solution of ethylene diamine. As the thread was formed, it was taken up on a spool. These spools were then placed in a water bath at 80° C. for two hours to complete the cure.

*Example 4.*—This example shows a comparison of the properties of threads prepared under exactly the same conditions from 1,4-diethylbenzene-$\beta,\beta'$-diisocyanate (DEBI) and from toluene diisocyanate (TDI) using a procedure and, in the case of the TDI-based thread, a formulation which is employed commercially in the manufacture of spandex fiber.

The TDI-based thread was prepared as follows:

500 parts of a polyester resin obtained from the reaction of adipic acid with ethylene glycol and propylene glycol and having an hydroxyl number of 36.4, an acid number of 0.21, and a molecular weight of 4100 was reacted with 86 parts of toluene diisocyanate (comprising about 80 wt. percent of the 2,4-isomer and 20 wt. percent of the 2,6-isomer) for one hour at 200° F. The resulting isocyanate-terminated prepolymer had a free isocyanate value of 3.98 and a calculated molecular weight of 4448. The prepolymer so obtained was then extruded through a die into an approximately 40% aqueous ethylene diamine solution bath and the extruded thread, after passage through the diamine bath, was washed with water, dried and cured by heating at about 400° F. The TDI-based polyurethane thread so obtained was approximately 100 gage, having a weight of 18.5 mg./ft.

Using exactly the same procedure described above, but replacing the toluene diisocyanate by an exactly equivalent amount of DEBI, there was obtained a DEBI-based polyurethane thread of approximately 100 gage having a weight of 18.5 mg./ft.

Each of the threads so obtained was submitted to testing using a standard IP-2 Scott tester to determine the 300% modulus, elongation and tensile strength. The data so obtained was as follows:

| Property | DEBI-based fiber | TDI-based fiber |
| --- | --- | --- |
| Tensile strength, p.s.i. | 8,410 | 8,700 |
| 300% modulus, p.s.i. | 3,950 | 2,610 |
| Elongation | 585 | 730 |

The resistance of the two threads to oxidizing bleach was tested by immersing a sample of each thread in household chlorine bleach solution (5.25 percent sodium hypochlorite solution) at room temperature (circa 70° F.) for 1 hour. At the end of this time the thread prepared from TDI had turned pale yellow whereas the thread prepared from DEBI showed no change from its original white.

Samples of the two threads were exposed to ordinary daylight for a period of 3½ months at the end of which time the TDI-based thread was yellowish-brown in color whereas the DEBI-based thread was still white.

The above data indicates that (a) the DEBI-based thread possessed comparable tensile strength and elongation properties to those of the TDI-based thread, the value of these properties being within the limits acceptable for commercial spandex fiber (b) the DEBI-based thread possessed markedly greater modulus than the TDI-based thread indicating that, for any required order of elasticity, a substantially finer denier could be used in the case of the TDI-based thread and (c) the DEBI-based thread was resistant to oxidizing chlorine bleach whereas the TDI-based thread was not.

We claim:

1. An elastomeric polyurethane fiber wherein the polyurethane has been formed by reacting:
   (a) an isocyanate-terminated prepolymer obtained from the reaction of 1,4-diethylbenzene-$\beta,\beta'$-diisocyanate and an essentially linear polyol having a hydroxyl number in the range of about 35 to 450; and
   (b) from about 0.8 to about 1.0 equivalent, based on free isocyanate groups in said prepolymer, of a difunctional active-hydrogen containing chain extender.

2. An elastomeric polyurethane fiber wherein the polyurethane has been formed by reacting:
   (a) an isocyanate-terminated prepolymer obtained by reacting 1,4-diethylbenzene-$\beta,\beta'$-diisocyanate with an excess of an essentially linear polyol having a hydroxyl number in the range of about 35 to about 450 and reacting the hydroxyl-terminated prepolymer so obtained with an excess, based on free hydroxy groups in said hydroxy-terminated prepolymer, of 1,4-diethylbenzene-$\beta,\beta'$-diisocyanate; and
   (b) from about 0.8 to about 1.0 equivalent, based on free isocyanate groups in said prepolymer, of a difunctional active-hydrogen containing chain extender.

3. The polyurethane of claim 2 wherein the difunctional active-hydrogen containing chain extender is an aliphatic primary diamine.

4. In a polyurethane elastomer fiber wherein the polyurethane has been formed by reacting a diisocyanate with an essentially linear polyol having an hydroxyl number in the range of about 35 to about 450 to yield an isocyanate-terminated prepolymer and reacting the latter with a difunctional active hydrogen containing chain extender, the improvement wherein the diisocyanate employed in the preparation of said elastomer fiber is 1,4-diethylbenzene-$\beta,\beta'$-diisocyanate.

References Cited

FOREIGN PATENTS 675,618   12/1963   Canada.

DONALD E. CZAJA, Primary Examiner

M. J. WELSH, Assistant Examiner

U.S. Cl. X.R.

260—37, 77.5; 264—184